United States Patent
Wei (10) Patent No.: US 10,739,612 B2
(45) Date of Patent: Aug. 11, 2020

(54) 3D DISPLAY DEVICE AND DISPLAY METHOD THEREOF

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 616 days.

(21) Appl. No.: 15/124,154

(22) PCT Filed: Dec. 11, 2015

(86) PCT No.: PCT/CN2015/097116
§ 371 (c)(1),
(2) Date: Sep. 7, 2016

(87) PCT Pub. No.: WO2017/020473
PCT Pub. Date: Feb. 9, 2017

(65) Prior Publication Data
US 2017/0176759 A1 Jun. 22, 2017

(30) Foreign Application Priority Data

Aug. 5, 2015 (CN) .......................... 2015 1 0474337

(51) Int. Cl.
*G02B 27/22* (2018.01)
*G02B 30/27* (2020.01)
(Continued)

(52) U.S. Cl.
CPC ............. *G02B 30/27* (2020.01); *G09G 3/003* (2013.01); *G09G 3/36* (2013.01)

(58) Field of Classification Search
USPC .............. 359/462–464; 348/42–60; 353/7–9; 349/8–9, 15
See application file for complete search history.

(56) References Cited

U.S. PATENT DOCUMENTS

2009/0278936 A1 11/2009 Pastoor et al.
2012/0113100 A1* 5/2012 Niioka ............... G02B 27/2214
345/419
(Continued)

FOREIGN PATENT DOCUMENTS

CN 101895777 A 11/2010
CN 102510515 A 6/2012
(Continued)

OTHER PUBLICATIONS

First Chinese Office Action dated Dec. 30, 2016; Appln. No. 201510474337.0.
(Continued)

*Primary Examiner* — Stephone B Allen
*Assistant Examiner* — Jyotsna V Dabbi (57) ABSTRACT

A three dimensional (3D) display device and a display method thereof are provided. The 3D display device includes a two dimensional (2D) display panel (100) and a slit grating (200) superimposed on the 2D display panel (100). The 2D display panel includes a plurality of subpixels sequentially arranged in a row direction and a column direction; the slit grating includes a plurality of light-transmitting strips (202) and a plurality of light-shielding strips (201) which are parallel to each other and alternately and periodically arranged. An angle formed by a central axis of each of the light-transmitting strips or a central axis of each of the light-shielding strips and the column direction is an acute angle. An area between the central axes of two adjacent light-shielding strips is divided into a first subarea disposed on a first side and a second subarea disposed on a second side by a central axis of a light-transmitting strip between the two adjacent light-shielding strips; subpixels whose area falling into the first subarea is greater than ½ subpixel area are first viewpoint subpixels; and subpixels whose area falling into the second subarea is greater than ½ subpixel area are second viewpoint subpixels.

20 Claims, 4 Drawing Sheets

(51) Int. Cl.
G09G 3/00 (2006.01)
G09G 3/36 (2006.01)

(56) References Cited

U.S. PATENT DOCUMENTS

| | | | |
|---|---|---|---|
| 2012/0249530 A1* | 10/2012 | Fukushima | G02B 27/2214 345/419 |
| 2013/0088526 A1* | 4/2013 | Koito | H04N 13/315 345/690 |
| 2014/0313296 A1* | 10/2014 | Song | H04N 13/302 348/54 |
| 2015/0070478 A1 | 3/2015 | Wei | |
| 2015/0189259 A1 | 7/2015 | An et al. | |

FOREIGN PATENT DOCUMENTS

| | | | | |
|---|---|---|---|---|
| CN | 202975533 | U | 6/2013 | |
| CN | 103325316 | A | 9/2013 | |
| CN | 10342487 | A | 12/2013 | |
| CN | 203444166 | U | 2/2014 | |
| CN | 103873844 | A | 6/2014 | |
| CN | 104423051 | A | 3/2015 | |
| CN | 10475319 | A | 7/2015 | |
| CN | 104965308 | A | 10/2015 | |
| JP | 2012-185275 | A | 9/2012 | |
| WO | WO-2015198606 | A1 * | 12/2015 | G02B 3/0037 |

OTHER PUBLICATIONS

The Second Chinese Office Action dated Jun. 5, 2017; Appln. No. 201510474337.0.

International Search Report and Written Opinion dated May 9, 2016, PCT/CN2015/097116.

* cited by examiner

3D DISPLAY DEVICE AND DISPLAY METHOD THEREOF

TECHNICAL FIELD

Embodiments of the present invention relate to a 3D display device and a display method thereof.

BACKGROUND

In a glasses-free 3D display, a viewer can view 3D images without wearing any typoscope such as glasses and helmet. A grating 3D display receives much concern due to the advantages of simple structure, low production cost, high performance, etc. The grating 3D display may be divided into slit grating 3D display and lenticular lens grating 3D display according to different gratings.

In a conventional 3D display, the extension direction of slits of a slit grating or the extension direction of central axes of a lenticular lens grating is generally parallel to the column direction of a 2D display panel. In this way, Moire fringe will be produced due to the interference effect of a grating periodic structure and a black matrix (BM) periodic structure on a 2D display, and hence the visual effect in the case of stereoscopic viewing can be severely affected. In order to reduce the influence of the Moire fringe, a grating may be inclined at a certain angle, namely a certain included angle is formed between the grating and the column direction of the 2D display panel. However, although the inclined grating can reduce the Moire fringe, the crosstalk between different viewpoint pixels can be increased.

SUMMARY

Some embodiments of the invention provides a three dimensional (3D) display device, comprising a two dimensional (2D) display panel and a slit grating superimposed on the 2D display panel, wherein the 2D display panel includes a plurality of subpixels sequentially arranged in a row direction and a column direction; the slit grating includes a plurality of light-transmitting strips and a plurality of light-shielding strips which are parallel to each other and alternately and periodically arranged;

an angle formed by a central axis of each of the light-transmitting strips or a central axis of each of the light-shielding strips and the column direction is an acute angle;

an interval between central axes of adjacent light-transmitting strips or an interval between central axes of adjacent light-shielding strips is equal to a size of an odd number of subpixels in the row direction, and the odd number is three or more;

an area between the central axes of two adjacent light-shielding strips is divided into a first subarea disposed on a first side and a second subarea disposed on a second side by a central axis of a light-transmitting strip between the two adjacent light-shielding strips; subpixels whose area falling into the first subarea is greater than ½ subpixel area are first viewpoint subpixels; and subpixels whose area falling into the second subarea is greater than ½ subpixel area are second viewpoint subpixels.

In some examples, subpixels whose area falling into the first subarea and area falling into the second subarea are both ½ subpixel area are the first viewpoint subpixels.

In some examples, subpixels whose area falling into the first subarea and area falling into the second subarea are both ½ subpixel area are black subpixels.

In some examples, subpixels whose area falling into the first subarea or the second subarea is ½ subpixel area and whose area is outside the first subarea and the second subarea is ½ subpixel area are the first viewpoint subpixels or the second viewpoint subpixels.

In some examples, subpixels whose area falling into the first subarea or the second subarea is ½ subpixel area and whose area is outside the first subarea or the second subarea is ½ subpixel area are black subpixels.

In some examples, the slit grating is disposed on a display surface of the 2D display panel; and a distance h between the slit grating and the display surface of the 2D display panel is:

$$h = \frac{n}{2} \times \frac{as}{L},$$

in which a refers to a size of each subpixel in the row direction; s refers to a distance between the slit grating and a human-eye viewpoint; L refers to an interpupillary distance of the human eye; and n refers to an odd number which is three or more.

In some examples, the slit grating is disposed on an opposite side of a display surface of the 2D display panel; and a distance h between the slit grating and the display surface of the 2D display panel is:

$$h = \frac{2}{n} \times \frac{sL}{a} - s,$$

in which a refers to a size of each subpixel in the row direction; s refers to a distance between the display surface of the display panel and a human-eye viewpoint; L refers to an interpupillary distance of the human eye; and n refers to an odd number which is three or more.

In some examples, the interval between the central axes of the adjacent light-transmitting strips or the interval between the central axes of the adjacent light-shielding strips is equal to the size of 3, 5 or 7 subpixels in the row direction.

In some examples, a ratio of a size of each subpixel in the row direction to a size of each subpixel in the column direction is 1:3.

In some examples, the plurality of subpixels include red (R) subpixels, green (G) subpixels and blue (B) subpixels which are sequentially and repeatedly arranged in the row direction.

In some examples, the first viewpoint subpixels and the second viewpoint subpixels are respectively right-eye image subpixels and left-eye image subpixels.

Some embodiments of the invention provides a three dimensional (3D) display device, comprising a two dimensional (2D) display panel and a lenticular lens grating superimposed on the 2D display panel, wherein the 2D display panel includes a plurality of subpixels sequentially arranged in a row direction and a column direction; the lenticular lens grating includes a plurality of lenticular lens units which are parallel to each other;

an angle formed between a central axis of each of the lenticular lens units and the column direction is an acute angle;

a width of each lenticular lens unit is equal to a size of an odd number of subpixels in the row direction, and the odd number is three or more;

an area between two edges on both sides of the central axis of each lenticular lens unit is divided into a first subarea and a second subarea by the central axis; subpixels whose area falling into the first subarea is greater than ½ subpixel area are first viewpoint subpixels; and subpixels whose area falling into the second subarea is greater than ½ subpixel area are second viewpoint subpixels.

In some examples, subpixels whose area falling into the first subarea and area falling into the second subarea are both ½ subpixel area are the first viewpoint subpixels.

In some examples, subpixels whose area falling into the first subarea and area falling into the second subarea are both ½ subpixel area are the second viewpoint subpixels.

In some examples, subpixels whose area falling into the first subarea and area falling into the second subarea are ½ subpixel area are black subpixels.

In some examples, subpixels whose area falling into the first subarea or the second subarea is ½ subpixel area and whose area is outside the first subarea and the second subarea is ½ subpixel area are the first viewpoint subpixels or the second viewpoint subpixels.

In some examples, subpixels whose area falling into the first subarea or the second subarea is ½ subpixel area and whose area is outside the first subarea and the second subarea is ½ subpixel area are black subpixels.

In some examples, the lenticular lens grating is disposed on a display surface of the 2D display panel; and a distance h between the lenticular lens grating and the 2D display panel is:

$$h = \frac{n}{2} \times \frac{as}{L},$$

in which a refers to a size of each subpixel in the row direction; s refers to a distance between the lenticular lens grating and a human-eye viewpoint; L refers to an interpupillary distance of the human eye; and n refers to an odd number which is three or more.

In some examples, a width of each lenticular lens unit is equal to a size of 3, 5 or 7 subpixels in the row direction.

In some examples, a ratio of a size of each subpixel in the row direction to a size of each subpixel in the column direction is 1:3.

In some examples, the plurality of subpixels include R subpixels, G subpixels and B subpixels which are sequentially and repeatedly arranged in the row direction.

In some examples, the first viewpoint subpixels and the second viewpoint subpixels are respectively right-eye image subpixels and left-eye image subpixels.

Some embodiments of the invention provides a display method of the 3D display device as mentioned above, comprising: applying driving signals corresponding to a first viewpoint image and a second viewpoint image to the first viewpoint subpixels and the second viewpoint subpixels respectively according to image information to be displayed.

In some examples, the driving signals corresponding to the first viewpoint image are applied to subpixels whose area falling into the first subarea and area falling into the second subarea are both ½ subpixel area.

In some examples, the driving signals corresponding to the second viewpoint image are applied to subpixels whose area falling into the first subarea and area falling into the second subarea are both ½ subpixel area.

In some examples, black driving signals are applied to subpixels whose area falling into the first subarea and area falling into the second subarea are both ½ subpixel area.

In some examples, the driving signals corresponding to the first viewpoint image or the second viewpoint image are applied to subpixels whose area falling into the first subarea or the second subarea is ½ subpixel area and whose area is outside the first subarea or the second subarea is ½ subpixel area.

In some examples, black driving signals are applied to subpixels whose area falling into the first subarea or the second subarea is ½ subpixel area and whose area is outside the first subarea or the second subarea is ½ subpixel area.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention shall fall within the scope of protection of the present invention.

Unless otherwise specified, the technical terms or scientific terms used herein shall have normal meanings understood by those skilled in the art. The words "first", "second" and the like used in the description and the claims of the patent application of the present invention do not indicate the sequence, the number or the importance but are only used for distinguishing different components. Similarly, the words "a", "an" and the like also do not indicate the number but only indicate at least one.

Embodiments of the present invention provide a 3D display device and a display method thereof. The 3D display device comprises a 2D display panel and a light-dividing device superimposed on the 2D display panel. The light-dividing device can propagate image light displayed by different pixels on the 2D display panel to different positions, so that the left eye and the right eye of a viewer can respectively receive image light with phase difference, so that 3D display perception can be produced. The light-dividing device in the embodiment of the present invention may be a slit grating or a lenticular lens grating. The grating may be a static grating or a dynamic grating formed by a liquid crystal display (LCD) panel, etc. No limitation will be given here in the embodiment of the present invention.

A projection of each repetition period (pitch) of the slit grating or the lenticular lens grating provided by the embodiment of the present invention on the 2D display panel covers an odd column (which is three or more) of subpixels, and an acute angle is formed between the extension direction of slits of the slit grating or lenticular lens units of the lenticular lens grating and the column direction of the 2D display panel. In this case, the Moire fringe can be reduced. The specific angle of the acute angle may be selected according to actual conditions (e.g., the reduced degree of the Moire fringe). No limitation will be given here in the embodiment of the present invention. In addition, due to subpixels for displaying a left-eye image and subpixels for displaying a right-eye image distributed in each period of the slit grating or the lenticular lens grating, the embodiment of the present invention can reduce the Moire fringe and meanwhile reduce the crosstalk. Moreover, although the projection of each period of the slit grating or the lenticular lens grating provided by the embodiment of the present invention on the 2D display panel can cover an odd column (which is three or more) of subpixels, the embodiment of the present invention, can have two-viewpoint display effect due to the distance between the light-dividing device and the display panel. Therefore, the embodiment of the present invention can avoid reduced image resolution caused by multi-viewpoint display and is applicable to most two-viewpoint film sources.

Further description will be given below to some embodiments of the present invention with reference to the accompanying drawings.

Figure 1:
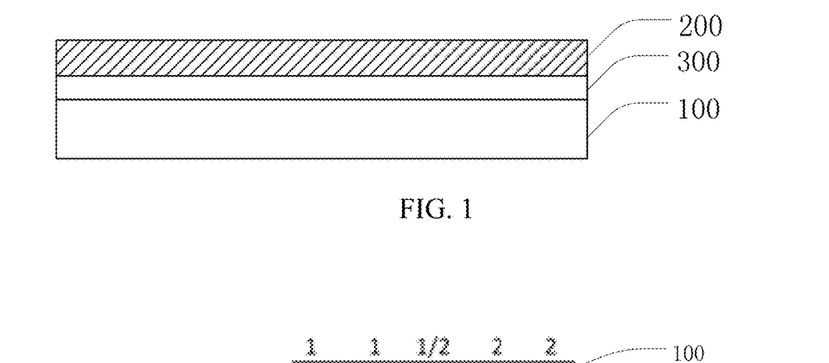
FIG. 1 is a schematic structural view of a 3D display device provided by the embodiment of the present invention.

FIG. 1 is a schematic structural view of a 3D display device provided by the embodiment of the present invention. As illustrated in FIG. 1, the 3D display device provided by some embodiments of the present invention comprises a 2D display panel 100 and a slit grating 200 superimposed on the 2D display panel. A transparent layer 300 may be disposed between the slit grating 200 and the 2D display panel 100 and, for instance, may be an optically transparent resin layer. Thus, the distance between the slit grating 200 and the 2D display panel 100 can be adjusted.

The slit grating 200 may be disposed on a display surface of the 2D display panel 100 and may also be disposed on an opposite side of the display surface of the 2D display panel 100. When the slit grating 200 is disposed on the display surface of the 2D display panel 100, image light displayed on the display panel 100 runs through slits (light-transmitting strips) in the slit grating 200 and is emitted from different angles to reach the left eye or the right eye of a viewer. When the slit grating 200 is disposed on the opposite side of the display surface of the 2D display panel 100, light emitted by a backlight runs through the slits of the slit grating 200, is incident into the display panel 100 at different angles, and is emitted from the display panel at different angles to reach the left eye o the right eye of the viewer. Detailed description will be given below to a setting method of the slit grating provided by the embodiment of the present invention with reference to the accompanying drawings.

Figure 2:
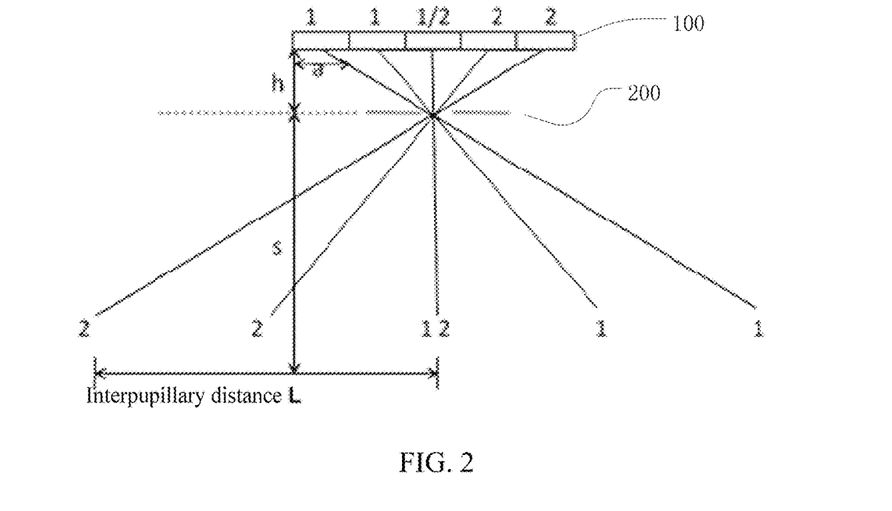
FIG. 2 is a schematic diagram illustrating the arrangement of a slit grating on a display surface of a 2D display panel.

FIG. 2 is a schematic diagram illustrating the arrangement of the slit grating on the display surface of the 2D display panel. As illustrated in FIG. 2, the slit grating 200 is disposed on the display surface of the display panel 100. As shown in the figure, 5 subpixels on the 2D display panel correspond to the structure of one slit (light-transmitting strip). That is to say, one period of the slit grating corresponds to 5 subpixels. It should be noted that FIG. 2 only illustratively draws one part of the 2D display panel and one part of the slit grating. In addition, FIG. 2 does not draw according to strict optical paths and is only intended to illustrate the arrangement relationship between the slit grating and the 2D display panel. In the conventional two-viewpoint 3D display method, the distance from the slit grating to the display surface of the display panel is h=sa/L, in which a refers to the size of each subpixel in the row direction; s refers to the distance between the slit grating and a human eye viewpoint; and L refers to the interpupillary distance of the human eye. However, in the embodiment of the present invention, the distance from the slit grating to the display surface of the 2D display panel is h=2.5sa/L and is 2.5 times of corresponding distance of the conventional two-viewpoint 3D display device. However, although the number of subpixels corresponding to one period of the slit grating is more, the embodiment of the present invention can still display in the form of two viewpoints, is applicable to most two-viewpoint film sources, and can avoid excessive reduction of the image resolution. As illustrated in FIG. 2, two subpixels on the left run through a slit and are projected to the right so as to display right-eye image light, and two subpixels on the right runs through the slit and are projected to the left so as to display left-eye image light. A subpixel disposed in the middle may be used for displaying a left-eye image or a right-eye image as the subpixel is disposed on the border of the left-eye image and the right-eye image. In the arrangement mode of the 3D display device provided by the embodiment of the present invention, the case that this part of subpixels display which kind of image information is designed, so that the crosstalk can be avoided. Further description will be given below.

Although description is given above by taking the case that one period of the slit grating corresponds to 5 subpixels as an example, the embodiment of the present invention is not limited thereto. For instance, the number of the subpixels here may be an odd number which is three or more, e.g., may be 3, 5, 7, etc. According to different number of subpixels corresponding to the period of the slit grating, the distance h is also as below:

$$h = \frac{n}{2} \times \frac{as}{L},$$

in which
a refers to the size of each subpixel in the row direction; s refers to the distance between the slit grating and a human-eye viewpoint; L refers to the interpupillary distance of the human eye; and a refers to an odd number which is three or more.

Figure 3:
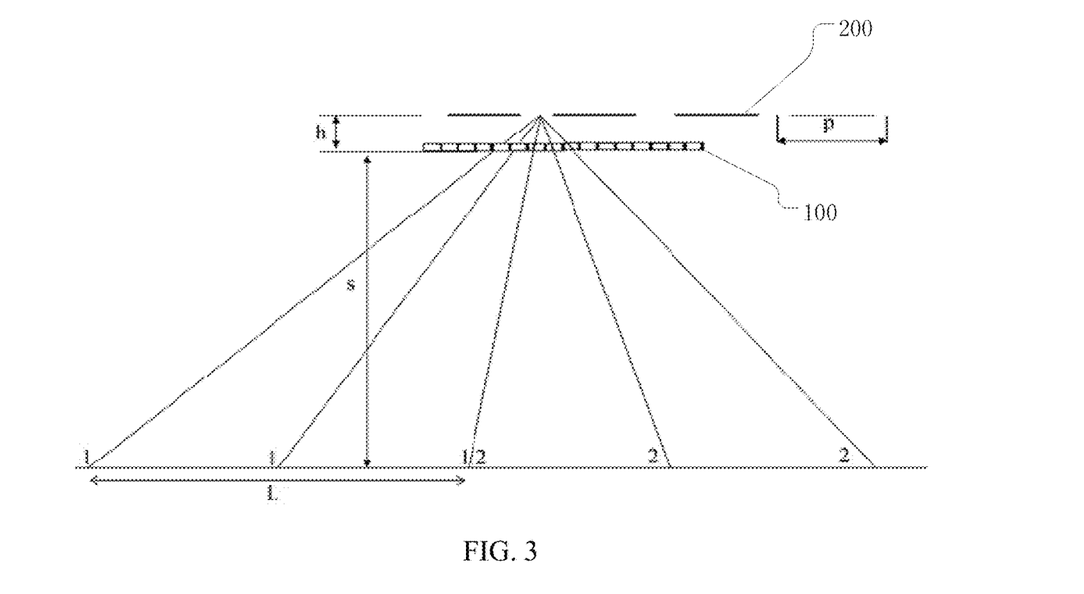
FIG. 3 is a schematic diagram illustrating the arrangement of the slit grating on an opposite side of the display surface of the 2D display panel.

FIG. 3 is a schematic diagram illustrating the arrangement of the slit grating on the opposite side of the display surface of the 2D display panel. As illustrated in FIG. 3, the slit grating is disposed on the opposite side of the display surface of the display panel. As shown in the figure, 5 subpixels correspond to the structure of one slit. That is to say, one period p of the slit grating corresponds to 5 subpixels. In this case, the distance from the slit grating to the display surface of the display panel is h=sL/2.5a−s, in which a refers to the size of each subpixel in the row direction; s refers to the distance between the display surface of the display panel and a human-eye viewpoint; and L refers to the interpupillary distance of the human eye. In addition, when the slit grating is disposed on the opposite side of the display surface of the 2D display panel, the pixel arrangement mode and the corresponding relationship between the slit grating and a pixel array are similar to the case that the slit grating is disposed on the display surface of the display panel. Therefore, the embodiment of the present invention can also display in the form of two viewpoints, is applicable to most two-viewpoint film sources, and can avoid excessive reduction of the image resolution.

Similarly, when the slit grating is disposed on the opposite side of the display panel of the 2D display panel, if one period of the slit grating corresponds to an odd number which is three or more, the distance from the slit grating to the display surface of the display panel is:

$$h = \frac{2}{n} \times \frac{sL}{a} - s,$$

in which a refers to the size of each subpixel in the row direction; s refers to the distance between the display surface of the display panel and a human-eye viewpoint; L refers to the interpupillary distance of the human eye; and n refers to an odd number which is three or more.

As described above, the embodiment of the present invention can reduce Moire fringe and meanwhile reduce crosstalk due to the subpixels for displaying the left-eye image and the subpixels for displaying the right-eye image distributed in each period of the slit grating or the lenticular lens grating. Detailed description will be given below to the pixel corresponding relationship between the 2D display panel and the light-dividing device (the slit grating or the lenticular lens grating).

Figure 4:
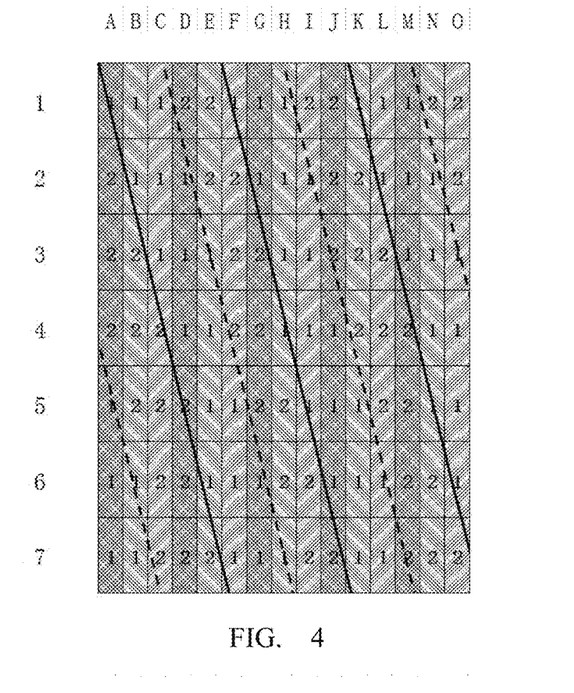
FIG. 4 is a layout diagram of a pixel array structure of the 2D display panel and the slit grating in some embodiments of the present invention.

FIG. 4 is a distribution diagram of a pixel array structure of the 2D display panel and the slit grating in one embodiment of the present invention. It should be noted that the figure only draws one part of the pixel array and one part of the slit grating and an actual display panel may be formed by repeated distribution on the basis of the structure as shown in the figure. In the figure, subpixels of different colors are represented by rectangular frames filled with different patterns. For instance, in the pixel array, subpixels of three colors are sequentially and repeatedly arranged in the row direction. For instance, the three colors may be respectively R, G and B. However, the embodiment of the present invention is not limited thereto. In addition, the figure illustrates 2D distribution of pixels in the form of strip arrangement. That is to say, the same column of subpixels has the same color and subpixels of different colors are sequentially and repeatedly arranged in the row direction.

However, in the embodiment of the present invention, the arrangement sequence of the subpixels of various colors is also not limited to the arrangement mode as shown in the figure. For instance, the slit grating includes a plurality of light-transmitting strips and a plurality of light-shielding strips which are parallel to each other and alternately and periodically arranged. For instance, the light-transmitting strip may be the slit. The oblique black line in the figure represents a projection of a central axis of a light-shielding strip in the slit grating on the 2D display panel, and the oblique dotted line represents a projection of a central axis of a light-transmitting strip (slit) in the slit grating on the 2D display panel. As seen from the figure, the interval between any two adjacent black lines or any two dotted lines is the period of the slit grating. As seen from the figure, the period of the slit grating generally corresponds to the width of 5 subpixels, namely the size of the 5 subpixels in the row direction. For instance, an area is defined between two adjacent black lines and is divided into two subareas by a dotted line between the two black lines. For the convenience of description, the subarea disposed on the left of the dotted line is referred to as the first subarea, and the subarea disposed on the right of the dotted line is referred to as the second subarea. The area here refers to an area defined by the projections of the central axes of the light-shielding strip and the light-transmitting strip in the slit grating on the display panel. For the convenience of description, the area may also be referred to as an area defined by the central axes of the light-transmitting strip and the light-shielding strip. For the convenient description of the arrangement mode of the embodiment of the present invention, subpixels for displaying a first viewpoint image are referred to as first viewpoint subpixels, and subpixels for displaying a second viewpoint image are referred to as second viewpoint subpixels. In the figure, the first viewpoint subpixels are marked as "1", and the second viewpoint subpixels are marked as "2". For instance, with reference to FIG. 2, most first viewpoint subpixels are disposed on the left of the central axis (dotted line) of the light-transmitting strip and will be disposed on the right after image light of the subpixels runs through the slit, and most second viewpoint subpixels are disposed on the right of the central axis of the light-transmitting strip and will be disposed on the left after image light of the subpixels runs through the slit. Therefore, the first viewpoint subpixels may be right-eye image subpixels, and the second viewpoint subpixels may be left-eye image subpixels. But the embodiment of the present invention is not limited thereto and may be randomly adjusted according to actual conditions.

For instance, an area between the first black line and the second black line counted from the left is selected as a target area and is divided into a first subarea and a second subarea by the dotted line in the middle. In the embodiment of the present invention, subpixels whose area falling into the first subarea is greater than ½ subpixel area are first viewpoint subpixels, and subpixels whose area falling into the second subarea is greater than ½ subpixel area are second viewpoint subpixels. For instance, taking the case that the third row of subpixels fall into the target area as an example, as most area (greater than ½ subpixel area) of subpixels 3C (a subpixel in the third row and the C column, and the following expression is the same and will not be further described) and 3D falls into the first subarea, the two subpixels are selected as first viewpoint subpixels; and as most area (greater than ½ subpixel area) of subpixels 3F and 3G falls into the second subarea, the two subpixels are selected as second viewpoint subpixels. As the subpixels whose area falling into the subareas is greater than ½ subpixel area are respectively selected as viewpoint subpixels corresponding to the subareas, the embodiment of the present invention can reduce the crosstalk between different viewpoint subpixels when the extension direction of the light-shielding strips or the light-transmitting strips of the slit grating is inclined to the column direction of the pixel array.

In addition, as seen from FIG. 4, apart from the subpixels whose area falling into the first subarea and the second subarea is greater than ½ subpixel area, there are subpixels bisected by the dotted line. That is to say, the area of the subpixel falling into the first subarea is ½ of the subpixel area, and the area of the subpixel falling into the second subarea is also ½ of the subpixel area. The bisection by the dotted line does not represent the complete bisection by the dotted line and may also be approximate bisection. For instance, the case that the area of two divided parts has a difference of 5% may be considered as the bisection of the subpixel. Therefore, the case that the area falling into the first subarea is ½ subpixel area and the area falling into the second subarea is also ½ subpixel area refers to that the area falling into the first subarea is approximately ½ subpixel area and the area falling into the second subarea is also approximately ½ subpixel area. Therefore, the case except the case of approximately ½ subpixel area can be considered as the case of greater than ½ subpixel area or less than ½ subpixel area. In addition, when ½ subpixel area is involved hereafter, the description on the approximately ½ subpixel area is also applicable. No further description will be given for simplification. In the embodiment of the present invention, subpixels bisected by the dotted line, e.g., a subpixel 3E, are selected as first viewpoint subpixels.

In addition, as seen from FIG. 4, apart from the subpixels of the above type, there are also subpixels bisected by the black line. That is to say, the area of the subpixel falling into the first subarea or the second subarea is ½ of the subpixel area, but the other ½ subpixel area is on the outside of the researched target area. In the embodiment of the present invention, the subpixel, e.g., a subpixel 1A or 5D, may be the first viewpoint subpixel and may also be the second viewpoint subpixel. The subpixel 1A is selected as the first viewpoint subpixel, and the subpixel 5D is selected as the second viewpoint subpixel.

In the embodiment, all the subpixels falling into the target area will be fully allocated. When the area of the subpixel falling into the target area is less than ½ subpixel area, the subpixel will fall into an adjacent target area, namely will become a research subject in the adjacent target area. According to the above arrangement mode, all the subpixels may be allocated into first viewpoint subpixels and second viewpoint subpixels. Therefore, the image brightness in the case of 3D display can be guaranteed.

Figure 5:
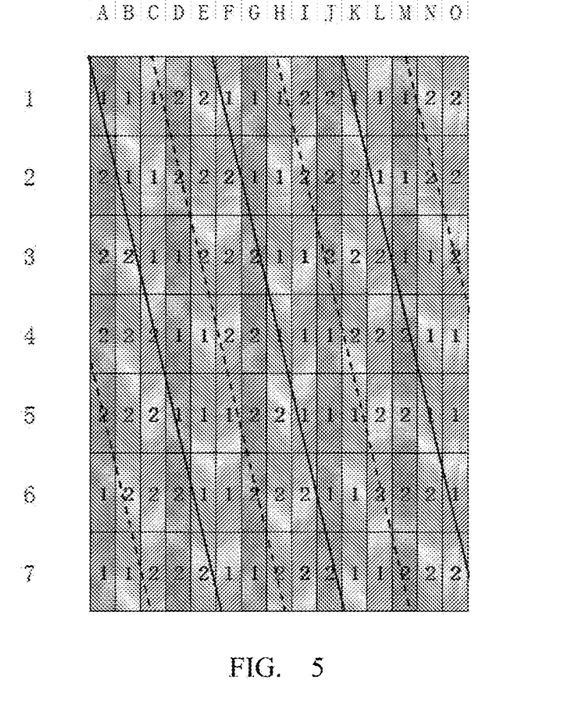
FIG. 5 is a layout diagram of a pixel array structure of the 2D display panel and the slit grating in some embodiments of the present invention.

In some other embodiments of the present invention, as illustrated in FIG. 5, the arrangement mode as shown in FIG. 5 is similar to the arrangement mode as shown in FIG. 4. As different from the subpixel bisected by the dotted line, that is to say, subpixels whose area falling into the first subarea is ½ subpixel area and whose area falling into the second subarea is also ½ subpixel area are selected as second viewpoint subpixels. The selection of other subpixels is similar to the case as shown in FIG. 4. No further description will be given here.

Figure 6:
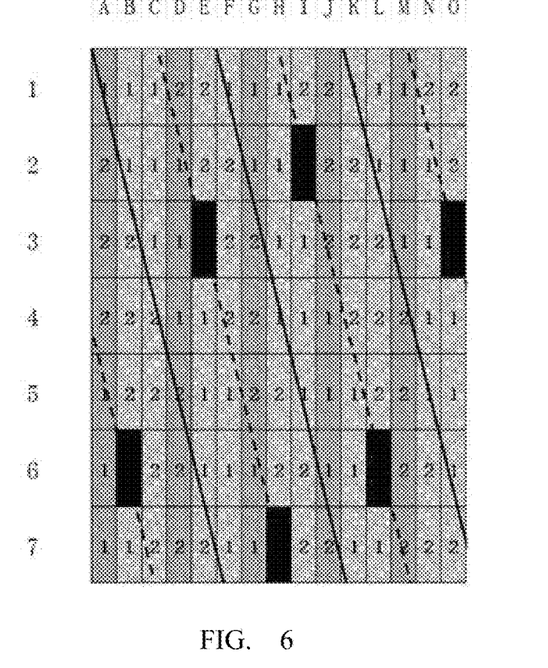
FIG. 6 is a layout diagram of a pixel array structure of the 2D display panel and the slit grating in some embodiments of the present invention.

In some other embodiments of the present invention, as illustrated in FIG. 6, subpixels bisected by the dotted line, namely subpixels whose area falling into the first subarea is ½ subpixel area and whose area falling into the second subarea is also ½ subpixel area, are selected as black subpixels. That is to say, the subpixels are displayed in black. In addition, in the embodiments, subpixels bisected by the black line, namely subpixels whose area falling into the first subarea or the second subarea is ½ subpixel area and the other ½ subpixel area is on the outside of the researched target area, may be subpixels of the first viewpoint and may also be subpixels of the second viewpoint.

In the embodiments of the present invention, as the subpixels bisected by the dotted line are displayed in black, image light of the subpixels cannot simultaneously enter a left-eye visual area and a right-eye visual area. Compared with the arrangement mode as shown in FIG. 4 or FIG. 5, the embodiments of the present invention can further reduce crosstalk.

Figure 7:
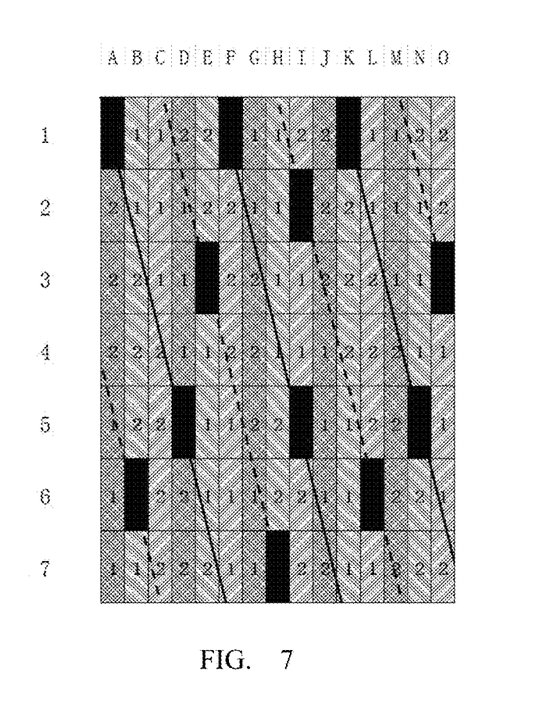
FIG. 7 is a layout diagram of a pixel array structure of the 2D display panel and the slit grating in some embodiments of the present invention.

In some other embodiments of the present invention, as illustrated in FIG. 7, subpixels bisected by the dotted line, namely subpixels whose area falling into the first subarea is ½ subpixel area and whose area falling into the second subarea is also ½ subpixel area, are selected as black subpixels. That is to say, the subpixels are displayed in black. In addition, in the embodiments, subpixels bisected by the black line, namely subpixels whose area falling into the first subarea or the second subarea is ½ subpixel area and the other ½ subpixel area is on the outside of the researched target area, are selected as black subpixels.

In the embodiments of the present invention, as the subpixels bisected by the dotted line are displayed in black, image light of the subpixels cannot simultaneously enter the left-eye visual area and the right-eye visual area. In addition, as the subpixels bisected by the black line are displayed in black, image light of the subpixels cannot simultaneously enter a left-eye visual area and a right-eye visual area. Compared with the arrangement mode as shown in FIG. 6, the embodiments of the present invention can further reduce crosstalk.

Figure 8:
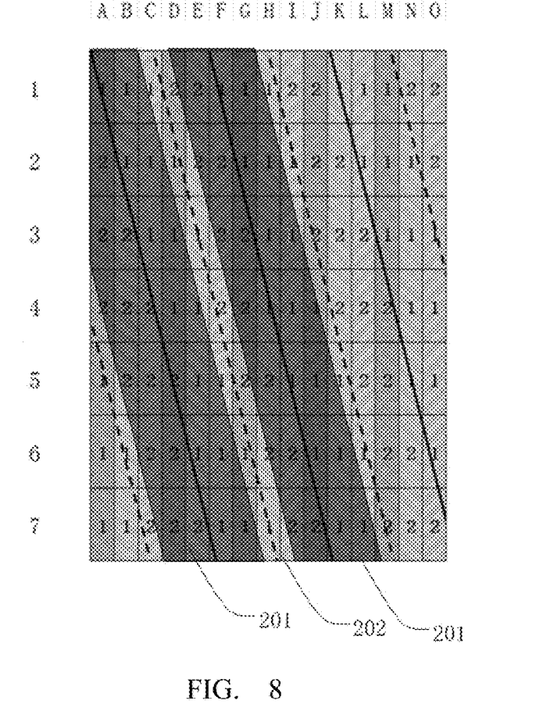
FIG. 8 is a distribution diagram of light-shielding strips and a light-transmitting strip in a slit grating provided by the embodiment of the present invention.

The case that the slit grating is taken as the light-dividing device is described above. FIG. 8 is a distribution diagram of light-shielding strips and a light-transmitting strip in the slit grating provided by the embodiment of the present invention. FIG. 8 illustrates two light-shielding strips 201 and a light-transmitting strip 202 disposed between the two light-shielding strips. A central axis of the light-shielding strip 201 is a black line, and a central axis of the light-transmitting strip 202 is a dotted line.

In addition, the embodiment of the present invention may also be applied to the case that the lenticular lens grating is taken as the light-dividing device. For instance, the schematic structural view of a 3D display device comprising the lenticular lens grating may also refer to FIG. 1, and the slit grating 200 in FIG. 1 is replaced by a lenticular lens grating 200. For instance, the lenticular lens grating 200 is disposed on a display surface of a 2D display panel. The distance h between the lenticular lens grating 200 and the display surface of the 2D display panel 100 is:

$$h = \frac{n}{2} \times \frac{as}{L},$$

in which
a refers to the size of each subpixel in the row direction; s refers to the distance between the lenticular lens grating and a human-eye viewpoint; L refers to the interpupillary distance of the human eye; and n refers to an odd number which is three or more.

Figure 9:
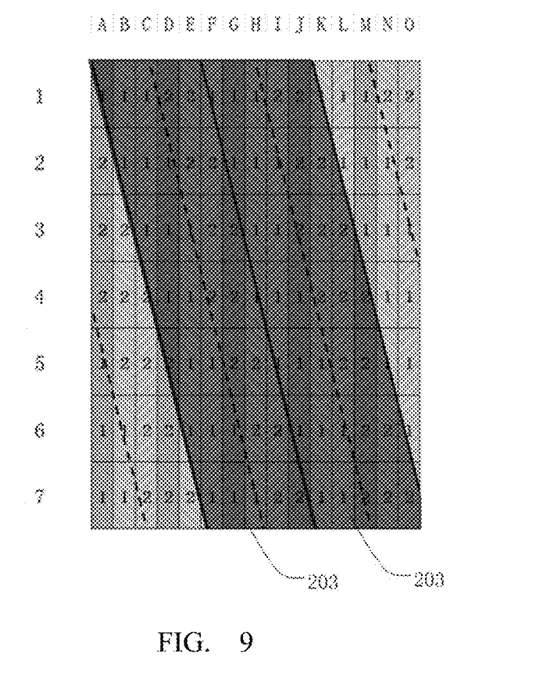
FIG. 9 is a distribution diagram of lenticular lens units in a lenticular lens grating provided by the embodiment of the present invention.

FIG. 9 is a distribution diagram of lenticular lens units in the lenticular lens grating provided by the embodiment of the present invention. For instance, as illustrated in FIG. 9, the lenticular lens grating comprises a plurality of lenticular lens units 203 (only two are illustratively shown in the figure for simplification) which are parallel to each other. A projection of the lenticular lens unit on the 2D display panel is in the form of a strip; edges on both sides of the strip are black lines; a central axis of the strip along the extension direction is a dotted line; and the width of the strip is the distance between two adjacent black lines. For the convenience of description, the central axis is referred to as the central axis of the lenticular lens unit, and the width of the strip is referred to as the width of the lenticular lens unit. An acute angle is formed between the central axis of the lenticular lens unit and the column direction and is similar to the angle of inclination of the slit grating. No further description will be given here. The width of each lenticular lens unit is equal to the size of an odd number (which is three or more) of subpixels in the row direction. That is to say, the period of the lenticular lens grating covers three or more odd number of subpixels. For instance, the odd number which is three or more here may be 3, 5 or 7.

The arrangement mode of the 3D display device comprising the lenticular lens grating may be similar to the arrangement mode of the slit grating. For instance, two edges on both sides of the central axis of the lenticular lens unit may be equivalent to the black lines in the above figure, and the central axis of the lenticular lens unit may be equivalent to the central axis in the above figure. For simplification, the specific arrangement diagram is not given here. The arrangement mode of the 3D display device comprising the lenticular lens may also be the arrangement mode as shown in FIGS. 4, 5, 6 and 7. That is to say, in the first case, the subpixels whose area falling into the first subarea is greater than ½ subpixel area are the first viewpoint subpixels; the subpixels whose area falling into the second subarea is greater than ½ subpixel area are the second viewpoint subpixels; the subpixels bisected by the dotted line are selected as the first viewpoint subpixels; and the subpixels bisected by the black line may be the subpixels of the first viewpoint and may also be the subpixels of the second viewpoint. In the second case, the subpixels whose area falling into the first subarea is greater than ½ subpixel area are the first viewpoint subpixels; the subpixels whose area falling into the second subarea is greater than ½ subpixel area are the second viewpoint subpixels; the subpixels bisected by the dotted line are selected as the second viewpoint subpixels; and the subpixels bisected by the black line may be the subpixels of the first viewpoint and may also be the subpixels of the second viewpoint. In the third case, the subpixels whose area falling into the first subarea is greater than ½ subpixel area are the first viewpoint subpixels; the subpixels whose area falling into the second subarea is greater than ½ subpixel area are the second viewpoint subpixels; the subpixels bisected by the dotted line are selected as the black subpixels; and the subpixels bisected by the black line may be the subpixels of the first viewpoint and may also be the subpixels of the second viewpoint. In the fourth case, the subpixels whose area falling into the first subarea is greater than ½ subpixel area are the first viewpoint subpixels; the subpixels whose area falling into the second subarea is greater than ½ subpixel area are the second viewpoint subpixels; the subpixels bisected by the dotted line are selected as the black subpixels; and the subpixels bisected by the black line may be the subpixels of the first viewpoint and may also be the black subpixels.

In addition, in the above embodiment, no matter the case that the slit grating is taken as the light-dividing device or the case that the lenticular lens grating is taken as the light-dividing device, the following features may be arbitrarily combined: the subpixels bisected by the dotted line are selected as the black subpixels; the subpixels bisected by the dotted line are selected as the first viewpoint subpixels; the subpixels bisected by the dotted line are selected as the second viewpoint subpixels; the subpixels bisected by the black line are selected as the first or second viewpoint subpixels; and the subpixels bisected by the black line are selected as the black subpixels.

In the above embodiment, description is given in the figure by taking the case that each period of the light-dividing device corresponds to 5 subpixels as an example. Meanwhile, 3 or 7 subpixels may also be adopted. It should be noted that the structure of 5 subpixels is superior to the structure of 3 or 7 subpixels in view of the effect of avoiding crosstalk.

The 2D display panel in the 3D display device provided by the embodiment of the present invention may be an LCD device or an organic light-emitting diode (OLED) display device. No specific limitation will be given here in the embodiment of the present invention. When the slit grating is disposed on the opposite side of the display surface of the display panel, as light of a backlight is divided into different beams, an OLED display panel without the backlight is not suitable for the structure. The applicability of various display panels may be arbitrarily set by those skilled in the art according to actual conditions.

In the display of the 3D display device provided by the embodiment of the present invention, adjacent subpixels with different colors may be selected to form a pixel for image display. When subpixels with the same viewpoint and only two colors are disposed in a selected target area, subpixels with the same viewpoint and different colors in adjacent target areas may be combined to form a pixel for display. The combination mode of the subpixels may be arbitrarily adjusted according to actual conditions. No further description will be given here.

In addition, some embodiments of the present invention further provide a display method of the 3D display device, which, for instance, comprises: applying driving signals corresponding to a first viewpoint image and a second viewpoint image to first viewpoint subpixels and second viewpoint subpixels respectively according to image information to be displayed.

In some embodiments, the driving signals corresponding to the first viewpoint image are applied to subpixels whose area falling into the first subarea and area falling into the second subarea are both ½ subpixel area, and the driving signals corresponding to the first viewpoint image or the second viewpoint image are applied to subpixels whose area falling into the first subarea or the second subarea is ½ subpixel area and whose area is outside the first subarea or the second subarea is ½ subpixel area.

In some embodiments, the driving signals corresponding to the second viewpoint image are applied to subpixels whose area falling into the first subarea and area falling into the second subarea are both ½ subpixel area, and the driving signals corresponding to the first viewpoint image or the second viewpoint image are applied to subpixels whose area falling into the first subarea or the second subarea is ½ subpixel area and whose area is outside the first subarea or the second subarea is ½ subpixel area.

In some embodiments, black driving signals are applied to subpixels in which both the area falling in the first subarea and area falling into the second subarea are both ½ subpixel area, and the driving signals corresponding to the first viewpoint image or the second viewpoint image are applied to subpixels whose area falling into the first subarea or the second subarea is ½ subpixel area and whose area is outside the first subarea or the second subarea is ½ subpixel area.

In some embodiments, black driving signals are applied to subpixels whose area falling into the first subarea and area falling into the second subarea are both ½ subpixel area, and black driving signals are applied to subpixels whose area falling into the first subarea or the second subarea is ½ subpixel area and whose area is outside the first subarea or the second subarea is ½ subpixel area.

In addition, the display method provided by the present invention may also include the step of applying corresponding driving signals to any combination of subpixels allocated by subpixels bisected by the dotted line or the black line.

The foregoing is only the preferred embodiments of the present invention and not intended to limit the scope of protection of the present invention. The scope of protection of the present invention should be defined by the appended claims.

The application claims priority to the Chinese patent application No. 201510474337.0, filed Aug. 5, 2015, the disclosure of which is incorporated herein by reference as part of the application.

The invention claimed is:

1. A three dimensional (3D) display device, comprising a two dimensional (2D) display panel and a slit grating superimposed on the 2D display panel, wherein the 2D display panel includes a plurality of subpixels sequentially arranged in a row direction and a column direction; the slit grating includes a plurality of light-transmitting strips and a plurality of light-shielding strips which are parallel to each other and alternately and periodically arranged;
    an angle formed by a central axis of each of the light-transmitting strips or a central axis of each of the light-shielding strips and the column direction is an acute angle;
    an interval between central axes of adjacent light-transmitting strips or an interval between central axes of adjacent light-shielding strips is equal to a size of an odd number of subpixels in the row direction, and the odd number is three or more;
    an area between the central axes of two adjacent light-shielding strips is divided into a first subarea disposed on a first side and a second subarea disposed on a second side by a central axis of a light-transmitting strip between the two adjacent light-shielding strips; subpixels whose area falling into the first subarea is greater than ½ subpixel area are first viewpoint subpixels; and subpixels whose area falling into the second subarea is greater than ½ subpixel area are second viewpoint subpixels.

2. The 3D display device according to claim 1, wherein subpixels whose area falling into the first subarea and area falling into the second subarea are both ½ subpixel area are the first viewpoint subpixels.

3. The 3D display device according to claim 2, wherein subpixels whose area falling into the first subarea or the second subarea is ½ subpixel area and whose area is outside the first subarea and the second subarea is ½ subpixel area are the first viewpoint subpixels or the second viewpoint subpixels.

4. The 3D display device according to claim 2, wherein subpixels whose area falling into the first subarea or the second subarea is ½ subpixel area and whose area is outside the first subarea or the second subarea is ½ subpixel area are black subpixels.

5. The 3D display device according to claim 1, wherein subpixels whose area falling into the first subarea and area falling into the second subarea are both ½ subpixel area are the second viewpoint subpixels.

6. The 3D display device according to claim 1, wherein subpixels whose area falling into the first subarea and area falling into the second subarea are both ½ subpixel area are black subpixels.

7. The 3D display device according to claim 1, wherein the slit grating is disposed on a display surface of the 2D display panel; and a distance h between the slit grating and the display surface of the 2D display panel is:

$$h = \frac{n}{2} \times \frac{as}{L},$$

in which
    a refers to a size of each subpixel in the row direction; s refers to a distance between the slit grating and a human-eye viewpoint; L refers to an interpupillary distance of the human eye; and n refers to an odd number which is three or more.

8. The 3D display device according to claim 1, wherein the interval between the central axes of the adjacent light-transmitting strips or the interval between the central axes of the adjacent light-shielding strips is equal to the size of 3, 5 or 7 subpixels in the row direction.

9. The 3D display device according to claim 1, wherein a ratio of a size of each subpixel in the row direction to a size of each subpixel in the column direction is 1:3.

10. The 3D display device according to claim 1, wherein the first viewpoint subpixels and the second viewpoint subpixels are respectively right-eye image subpixels and left-eye image subpixels; and
    the first viewpoint subpixels and the second viewpoint subpixels only comprise subpixels which contribute to form a left-eye image or a right-eye image.

11. A display method of the 3D display device according to claim 1, comprising: applying driving signals corresponding to a first viewpoint image and a second viewpoint image to the first viewpoint subpixels and the second viewpoint subpixels respectively according to image information to be displayed.

12. The 3D display device according to claim 1, wherein the slit grating is configured to allow light that is emitted by each of the first viewpoint subpixels and each of the second viewpoint subpixels and passes the slit grating to enter a left-eye visual area and a right-eye visual area.

13. A three dimensional (3D) display device, comprising a two dimensional (2D) display panel and a lenticular lens grating superimposed on the 2D display panel, wherein the 2D display panel includes a plurality of subpixels sequentially arranged in a row direction and a column direction; the lenticular lens grating includes a plurality of lenticular lens units which are parallel to each other;
    an angle formed between a central axis of each of the lenticular lens units and the column direction is an acute angle;
    a width of each lenticular lens unit is equal to a size of an odd number of subpixels in the row direction, and the odd number is three or more;

an area between two edges on both sides of the central axis of each lenticular lens unit is divided into a first subarea and a second subarea by the central axis; subpixels whose area falling into the first subarea is greater than ½ subpixel area are first viewpoint subpixels; and subpixels whose area falling into the second subarea is greater than ½ subpixel area are second viewpoint subpixels.

14. The 3D display device according to claim 13, wherein subpixels whose area falling into the first subarea and area falling into the second subarea are both ½ subpixel area are the first viewpoint subpixels.

15. The 3D display device according to claim 14, wherein subpixels whose area falling into the first subarea or the second subarea is ½ subpixel area and whose area is outside the first subarea and the second subarea is ½ subpixel area are the first viewpoint subpixels or the second viewpoint subpixels.

16. The 3D display device according to claim 14, wherein subpixels whose area falling into the first subarea or the second subarea is ½ subpixel area and whose area is outside the first subarea and the second subarea is ½ subpixel area are black subpixels.

17. The 3D display device according to claim 13, wherein subpixels whose area falling into the first subarea and area falling into the second subarea are both ½ subpixel area are the second viewpoint subpixels.

18. The 3D display device according to claim 13, wherein subpixels whose area falling into the first subarea and area falling into the second subarea are ½ subpixel area are black subpixels.

19. The 3D display device according to claim 13, wherein the first viewpoint subpixels and the second viewpoint subpixels only comprise subpixels which contribute to form a left-eye image or a right-eye image.

20. The 3D display device according to claim 13, wherein the slit grating is configured to allow light that is emitted by each of the first viewpoint subpixels and each of the second viewpoint subpixels and passes the slit grating to enter a left-eye visual area and a right-eye visual area.

\* \* \* \* \*